United States Patent

Bernard et al.

[11] 4,056,247
[45] Nov. 1, 1977

[54] AIRCRAFT ARRESTING GEAR NET RAISING DEVICE

[75] Inventors: Jean Paul Bernard, Paris; Paul A. Meningand, Clamart, both of France

[73] Assignee: Aerazur Constructions Aeronautiques, France

[21] Appl. No.: 711,661

[22] Filed: Aug. 4, 1976

[30] Foreign Application Priority Data

Aug. 5, 1975 France .................. 75.24372

[51] Int. Cl.² .................. B64F 1/02
[52] U.S. Cl. .................. 244/110 C
[58] Field of Search .......... 244/110 R, 110 A, 110 C, 244/110 F, 110 G, 114 R; 43/8; 74/580, 522.5, 469; 49/330, 340, 344, 345, 339; 14/53, 60, 71.1, 71.7, 71.5; 246/293, 261; 212/8 R, 35 R

[56] References Cited

U.S. PATENT DOCUMENTS

| | | | |
|---|---|---|---|
| 2,778,741 | 5/1954 | Pilch | 212/35 R |
| 2,854,201 | 9/1958 | Cotton | 244/110 R |
| 3,383,076 | 5/1968 | Van Zelm et al. | 244/110 C |

Primary Examiner—Trygve M. Blix
Assistant Examiner—Galen L. Barefoot
Attorney, Agent, or Firm—William Anthony Drucker

[57] ABSTRACT

In this device for raising the net of an aircraft arresting gear, a post is pivotally mounted on each side of the strip in a frame structure disposed obliquely to the center line of the strip, this post being pivotally connected intermediate its ends to the piston-rod of a pneumatic cylinder, the net suspension rope passing through the top of each post before being anchored to the ground.

3 Claims, 8 Drawing Figures

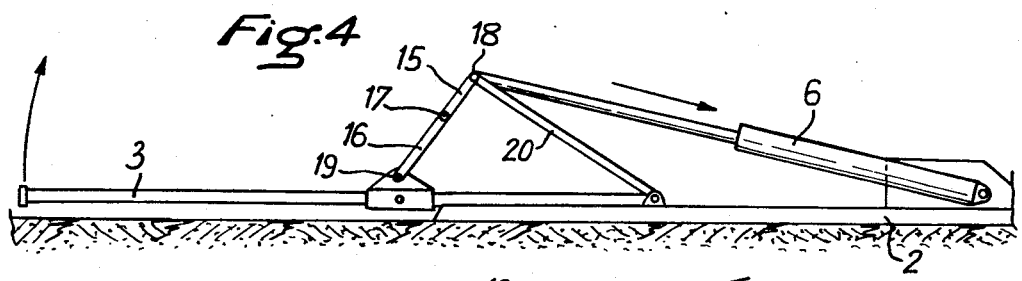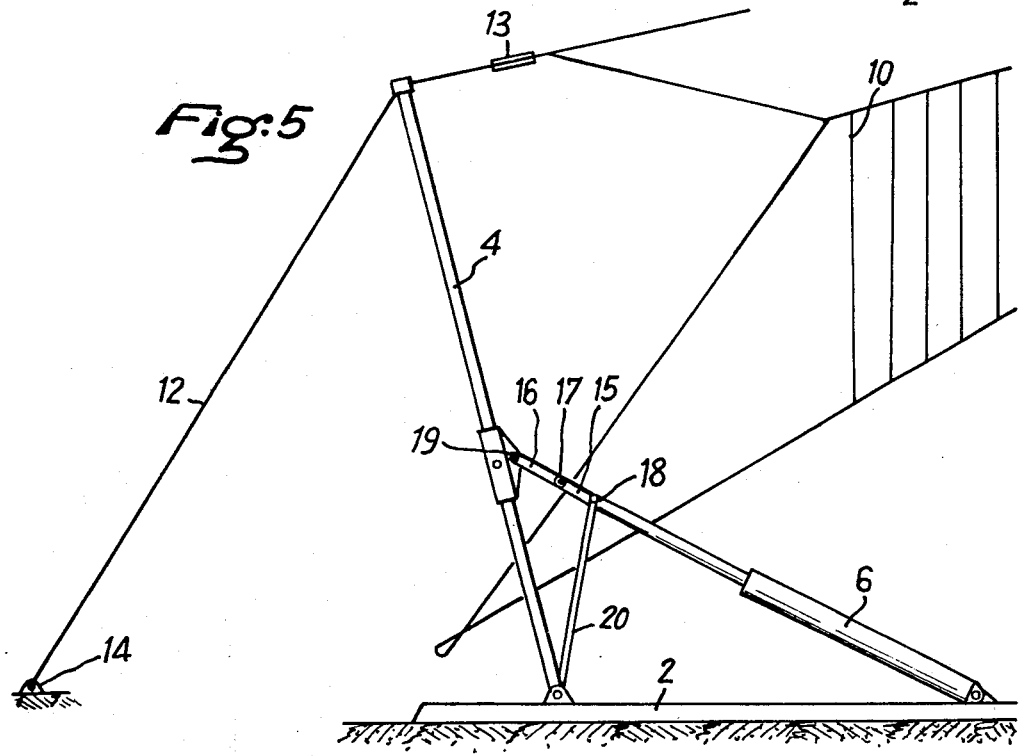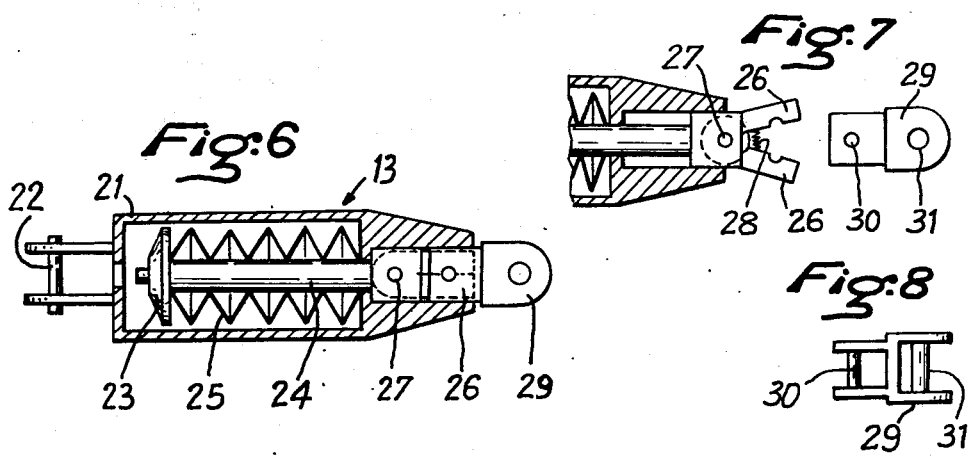

AIRCRAFT ARRESTING GEAR NET RAISING DEVICE

BACKGROUND OF THE INVENTION

1. Field of the Invention

This invention relates to improvements in or relating to the operation of systems for raising net-type aircraft arresting gears.

At present, on take-off and landing strips or runways these arresting gears consist mainly of a net adapted to be raised in front of the aircraft in case of emergency, or alternatively of a cable extending across the strip, in the case of aircraft equipped with a special crosshead.

It is the essential object of the present invention to widen the field of possible uses for the net raising system proper.

2. Description of the Prior Art

The most popular systems employed for this purpose consist in raising a net disposed flat on the ground across the strip by means of posts driven in turn by a rope secured to a pneumatic cylinder controlled either from the control tower or from the barrier itself. These cylinders are of the high-pressure type and operate as a rule under pressures of the order of 40 bars, and each post is swivel-mounted on a kind of universal joint to permit its movement in all directions. In the raised position the posts are braced by additional ropes anchored to small concrete blocks. Now this arrangement requires the use of several concrete blocks, as a rule six on each side of the runway, and also precise adjustments of the various components, frequent inspections and considerable maintenance, since certain components are symmetrical. On the other hand, the energy stored is relatively high and the cylinder power requirements are of the order of 12 tons, and a 2-ton stress is exerted permanently on various other components of the structure.

Other inconveniences are also observed. Thus, the high-pressure cylinder operation reduces considerably the number of times the posts can be raised (at the most five times with two air cylinders delivering seven thousand liters of expanded air), so that the compressed air cylinders must be replaced rather frequently, and the barrier cannot be used during such replacements. It is also impossible, on the other hand, to control the lowering of the barrier from the control tower, and also to refill the reservoir in the same manner. However, these operations must be accomplished on the site and require a crew of at least six men.

Obviously the cost of these known systems is relatively high, considering the number of component elements involved. High-pressure operation further involves the use of measuring and control instruments such as pressure-reducing valves, high-pressure control switches, etc. which, though mass-produced, are still very expensive devices.

SUMMARY OF THE INVENTION

Therefore, the Applicants were confronted with problem of avoiding the above-described inconveniences and eventually developed a low-pressure system, which lead to a point by point revision of hitherto accepted technical principles, with a view to minimize stress either through a modification or a more adequate arrangement of the component elements, or through a novel kinematic arrangement.

As far as efforts are concerned, attention should be paid firstly to the tension to be necessarily imparted to the upper straps of the net. This tension determines the height of the top portion of the net above the ground, which of course must exceed the height of the aircraft to be arrested. It is subordinate to the distance between the side posts, which in the formula is used in its square form, to the weight of the net per suspended meter, and to the net sag in relation to the top of the post to which it is anchored. The greater the sag, the lower the tension effort. By way of illustration the maximum height of existing posts is 6 meters. An exhaustive study proved that using eight-meter posts, which is still a reasonably acceptable value, would lead to a tension reduced to one-third with the same net, i.e., in the case of the heaviest nets, seven hundred kilograms instead of about two tons.

From the kinematic point of view, it was observed that when an eight-meter post (pivoted at its bottom end) was connected at about one-fourth to one-fifth of its height to the piston rod of a pneumatic cylinder, the efforts produced in the cylinder were substantially those required for tensioning the net; therefore, low-pressure operation could be contemplated by using smaller cylinders than those employed heretofore.

Another advantageous feature of low-pressure, high-post operation lies in the fact that the post supporting structure was not parallel to the strip but set at an angle of about 15° thereto. Therefore, during the rotational movement imparted to the post when raising same, the post top can move away from the strip axis or center line, and thus tension the top straps of the net anchored to the posts through a catenary system. Moreover, the slack imparted from the ground to the top strap of the net as a consequence of a pronounced sag of said strap in relation to the post top enables the post to be raised through an angle of about 45° without carrying along the net. This feature is particularly important for advantage is taken of the inherent inertia of the post and also of a high torque when the net is lifted off the ground.

A single bracing point located 16 meters away assists in improving the efficiency of the arresting gear.

BRIEF DESCRIPTION OF THE DRAWING

FIG. 4 is a side elevational view similar to FIG. 3 but showing the beginning of the raising operation, when the maximum torque is required only for lifting the post off the ground;

FIG. 5 is a similar side elevational view showing the post on its fully raised and operative position;

FIG. 6 is a part-sectional view of the release device, and

FIGS. 7 and 8 are detail views for explaining the mode of operation of the release device.

DESCRIPTION OF THE PREFERRED EMBODIMENT

Figure 1:
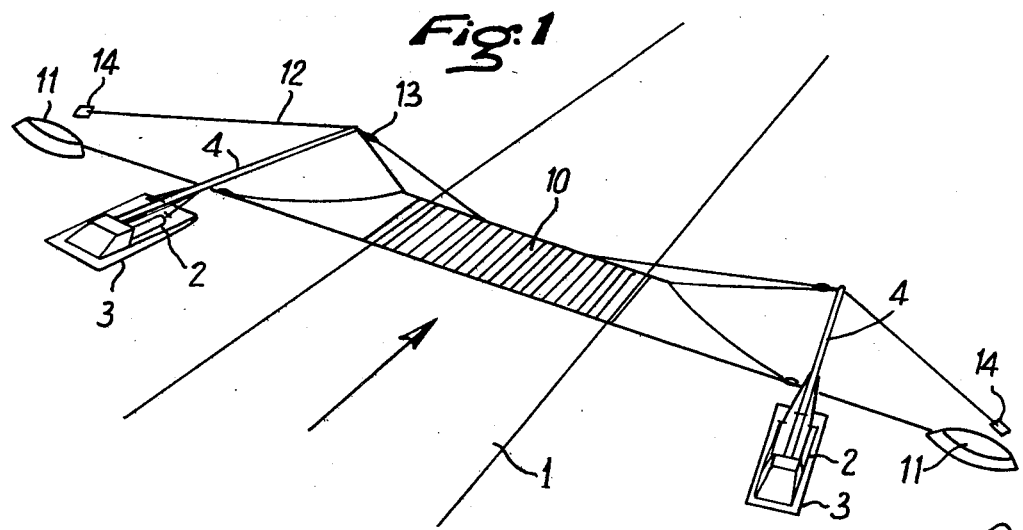
FIG. 1 is a perspective view of the arresting gear with the net thereof laid flat on the ground or strip, before its actuation.
Figure 2:
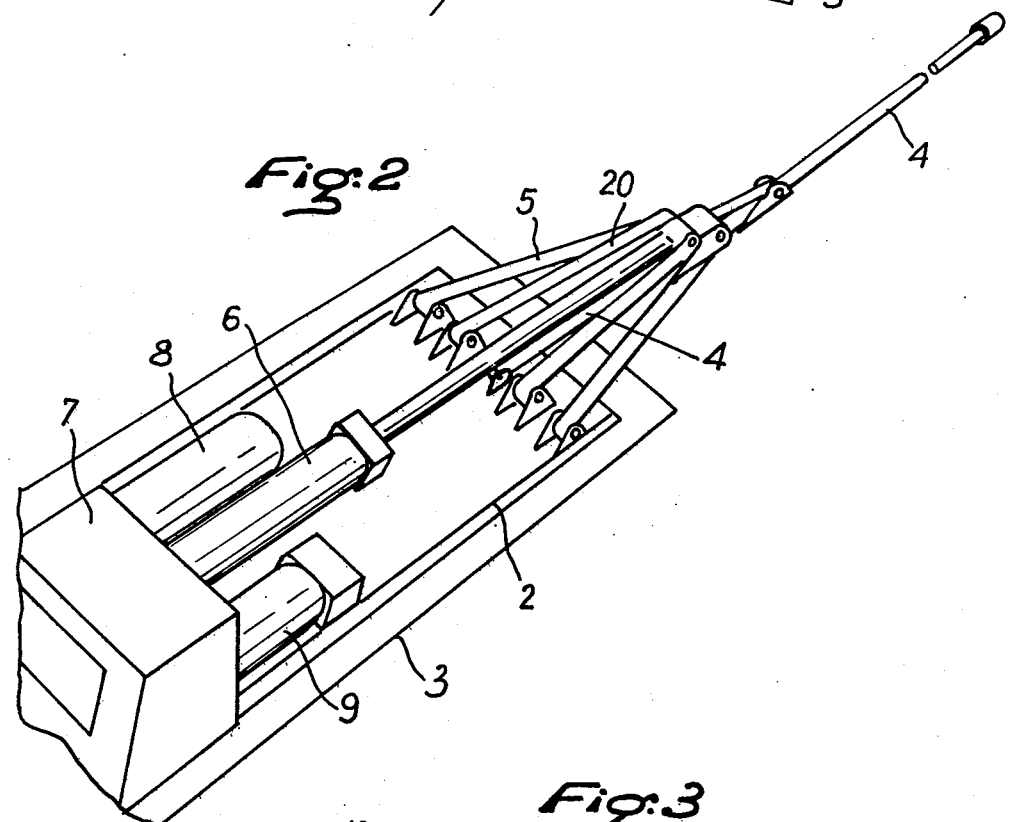
FIG. 2 is a perspective view of the unit comprising a post and its pneumatic cylinder and compressed-air supply means on a frame structure.

In the specific form of embodiment illustrated in the drawing the aircraft arresting gear according to this invention comprises on each side of the take-off or landing strip or runway 1 a frame structure 2 secured to a concrete base 3. Pivotally mounted to said frame structure 2 is a post 4 provided with struts 5 also pivoted to the frame structure 2 on each side of the pivotal mounting of the post 4 and forming with the pneumatic raising cylinder 6 a kind of footing to the post 4 when the latter is in its operative, raised position. A casing 7 encloses and protects the measuring instruments such as pressure-gauges and pressure-reducing valves controlling the pressure in a reservoir 8 supplied with compressed air from a cylinder 9.

On each side of the strip the net 10 constituting the arresting element proper of the gear is attached on the one hand to a brake 11 and has on the other hand its upper portion secured to a rope 12 via a release device 13 serving the purpose of detaching the net 10 from the rope 12 when the former is hit by an aircraft. This rope 12 extends freely through the post top and has its outer end anchored to a concrete block 14.

Now this release device will be described in detail, by way of example, with reference to FIGS. 6 to 8 of the drawing. It comprises a cylindrical body 21 having one end anchored to the post by means of a cross pin 22 and encloses a movable disk 23 rigid with an axial rod 24 on which a stack consisting of pairs of opposed dished spring-washers 25 is slipped. The opposite end of the device comprises a clamp carried by the corresponding end of rod 24 and consisting of a pair of jaws 26 pivotally mounted to said rod end by means of a pivot pin 27, said jaws 26 being constantly urged away from each other by a coil compression spring 28. When retracted within the body 21 as a consequence of the resilient force of spring washers 25, the jaws 26 are closed in the open end of said body 21, thus retaining therebetween a yoke 29 having two formed ends, one end carrying a cross pin 30 engageable by said jaws 26 and the other end carry another cross pin 31 for anchoring the net 10.

Figure 3:
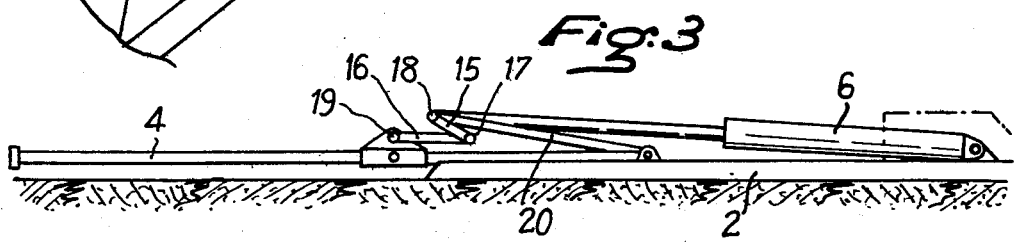
FIG. 3 is a side elevational view of the post in its retracted condition.

Another specific feature characterising the form of embodiment of the lifting device is its minimum over-all dimensions, notably a minimum height above the ground in the waiting or inoperative position, due to the knee-action system interposed between the outer end of the piston rod of cylinder 6 and the pivotal connection between said rod and the post 4, this system comprising a pair of arms 15, 16 pivotally interconnected at 17 and having their opposite ends also pivotally connected the one at 18 to the piston-rod of cylinder 6 and the other at 19 to the post 4, the highest point of this folded structure, as seen in FIG. 3, being about 32 cm above the ground surface.

A pair of tubular members 20 have one end pivoted to the frame structure 3 and the opposite end also pivotally connected to the pin 18 extending through the piston rod of cylinder 6 and supporting likewise the upper position 15 of the knee-action device, so that the initial lifting movement of the post can take place under the best possible conditions.

Now the mode of operation of this net raising gear will be described in detail with reference to FIGS. 1-5, but only the mechanical part of the gear, constituting the subject-matter of this invention, will be described for the electrical part controlling the solenoid valves for releasing the compressed air contained in reservoir 8 (FIG. 2) and delivering same to the cylinder 6 controlling the lifting and lowering movements of post 4, and therefore of the net 10 attached thereto (FIG. 1) is well-known in the art and does not require a detailed description. The only fact to be born in mind is that this electrical control system is enclosed in a small cabinet (not shown) located in the vicinity of the arresting gear and that a switchboard in the control tower may also remote-cntrol the raising and lowering of the net as well as the filling of the reservoirs. However, it may be pointed out that the use of the control tower switchboard entails the neutralization of the cabinet control system, and vice versa.

When the order to raise the net is delivered from the control tower switchboard or from the cabinet adjacent the arresting gear, the compressed air contained in reservoir 8 (FIG. 2) is fed via a solenoid valve (not shown) to the front end of cylinder 6, of which the piston is in the extended position shown in FIG. 3, so that this piston is driven to the rear and carries along during its stroke the tubular members 20 pivoted to the frame structure 2, and also the knee-action device 15, 16 to set these component elements in the relative positions shown in FIG. 4. Thus, a considerable torque is available to facilitate the raising of post 4 which carries along the net 10 and rope 12 anchored to the concrete block 14. It will be seen that while the rope 12 constitutes the hypotenuse of a right-angled triangle of which the minor side is the post 4 and the major side the distance between the concrete block 14 and the base of said post 4, during the lifting thereof there is theoretically no relative movement between the rope 12 and the post top.

FIG. 5 illustrates the configuration obtained at the end of the lifting phase. During its movement of rotation and as a consequence of the inclined position of post 4 in relation to the strip 1, the post top moves away from the center line of the strip and thus tensions the top strap of the net 10 anchored to the post.

To lower the net when necessary, the air contained in the front portion of cylinder 6 is forced out via a solenoid valve (not shown) disposed behind the piston, so as to apply a starting impulse to the post which will thus fall on the ground; any residual air trapped in front of the piston will act as a damping cushion to prevent an excessively fierce fall.

When the net 10 has been raised for engagement by an aircraft, the release device 13 (FIGS. 6–8) operates as explained hereinafter. The spring washers 25 are selected to withstand a force greater than that required for tensioning the net. When the aircraft hits the net, this force is attained or overstepped, so that the washers 25 are compressed as a consequence of the tractive effort exerted by the net via the anchoring yoke 29 and the movable disk 23 until the jaws 26 of the retaining clamp escape from the body 21 and diverge sufficiently, due to the force of spring 28 to permit the escape of cross-pin 30 and thus release the anchoring yoke 29 attached to the net 10.

Of course, this invention should not be construed as being strickly limited by the specific form of embodiment shown and described herein, since various modifications and variations may be brought thereto without departing from the basic principles of the invention as set forth in the appended claims.

What we claim is:

1. An aircraft arresting gear, for disposal across a runway having a center line, comprising:
   i. a pair of frame structures having a first end and a second end, said frame structures being intended for anchoring to the ground one at each side of the runway and obliquely to the center line of the runway ii. a pair of posts associated one with each of said frame structures, said posts each having a top end and a bottom end, each post being pivoted at its bottom end to its associated frame structure at the first end thereof
  iii. a rope connected to the top end of each post and disposed across the runway
  iv. a net disposed across the runway and connected along said rope
  v. a pair of pneumatically-operable piston-and-cylinder rams associated one with each of said frame structures, said ram being pivotably connected to the frame structure at the second end of the frame structure
  vi. a pair of connecting means each connecting a respective ram to a respective post, each connecting means having:
   a. a lever pivoted to the frame structure and the ram
   b. a pair of links pivotally connected end-to-end, one end of said pair of links being pivotally connected to the point of connection of the ram and lever, the other end of said pair of links being pivotally connected to said post intermediate its top and bottom ends.

2. An aircraft arresting gear, as claimed in claim 1, comprising a pair of means each forming a ground anchor, said rope being secured at each end to a respective ground anchor means and being freely longitudinally movable through the top end of each post.

3. An aircraft arresting gear, as claimed in claim 1, wherein the other end of said pair of links is connected to said post at a point about one fourth of the distance from the bottom end of the post towards the top end of the post.

* * * * *